US008386342B2

(12) United States Patent
Ferreri et al.

(10) Patent No.: US 8,386,342 B2
(45) Date of Patent: Feb. 26, 2013

(54) METHOD, SYSTEM, AND COMPUTER PROGRAM PRODUCT FOR PERFORMING INVENTORY MANAGEMENT

(75) Inventors: Anthony V. Ferreri, Hyde Park, NY (US); Carol E. Foreman, Hopewell Junction, NY (US); Vincent La Fera, Olivebridge, NY (US); Catherine A. Raybeck, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 1691 days.

(21) Appl. No.: 10/908,482

(22) Filed: May 13, 2005

(65) Prior Publication Data

US 2006/0259376 A1 Nov. 16, 2006

(51) Int. Cl.
*G06Q 10/00* (2012.01)
(52) U.S. Cl. ........................................ 705/28
(58) Field of Classification Search ............ 705/28
See application file for complete search history.

(56) References Cited

U.S. PATENT DOCUMENTS

| | | | | |
|---|---|---|---|---|
| 5,287,267 A * | 2/1994 | Jayaraman et al. | | 705/10 |
| 5,960,414 A * | 9/1999 | Rand et al. | | 705/28 |
| 6,397,226 B1 * | 5/2002 | Sage | | 705/22 |
| 6,516,301 B1 * | 2/2003 | Aykin | | 705/7.25 |
| 6,850,809 B1 * | 2/2005 | Callar et al. | | 700/96 |
| 7,120,592 B1 * | 10/2006 | Lewis | | 705/14.34 |
| 7,231,361 B2 * | 6/2007 | Eck et al. | | 705/29 |
| 7,324,860 B2 * | 1/2008 | Dyer | | 700/97 |
| 7,373,371 B2 * | 5/2008 | Eck et al. | | 705/29 |
| 7,620,619 B1 * | 11/2009 | Walker et al. | | 1/1 |
| 7,664,672 B1 * | 2/2010 | Walker et al. | | 705/26.4 |
| 7,840,449 B2 * | 11/2010 | Ebel et al. | | 705/28 |
| 2002/0069141 A1 * | 6/2002 | Kawamura et al. | | 705/28 |
| 2003/0050817 A1 * | 3/2003 | Cargille et al. | | 705/8 |
| 2003/0050826 A1 * | 3/2003 | Cargille et al. | | 705/10 |
| 2003/0050870 A1 * | 3/2003 | Cargille et al. | | 705/28 |
| 2003/0074284 A1 | 4/2003 | Bowden | | |
| 2003/0101107 A1 * | 5/2003 | Agarwal et al. | | 705/28 |
| 2004/0186795 A1 * | 9/2004 | Taylor et al. | | 705/29 |
| 2005/0060242 A1 | 3/2005 | Armstrong et al. | | |
| 2006/0085235 A1 * | 4/2006 | Nguyen et al. | | 705/7 |
| 2006/0085296 A1 * | 4/2006 | Strickland | | 705/28 |
| 2007/0162356 A1 * | 7/2007 | Nguyen et al. | | 705/28 |

* cited by examiner

*Primary Examiner* — Seye Iwarere
(74) *Attorney, Agent, or Firm* — Cantor Colburn LLP; Parashos Kalaitzis

(57) ABSTRACT

A method, system, and computer program product for performing inventory management. The method includes determining excess inventory for a plurality of site locations, determining inventory shortfalls for a plurality of site locations, and applying business logic to the excess inventory resulting in an inventory balancing plan. The inventory balancing plan includes optimal redistribution of excess inventory to site locations determined to be in need of the excess inventory. The method also includes generating and transmitting orders for the excess inventory in accordance with the inventory balancing plan prior to developing a supplier forecast.

20 Claims, 8 Drawing Sheets

Base Select: --All Plants-- ▶ | 2004/06/01 14:06:10 = Base[405] - 200405P1R ▶

Report Select: Item Inventory Balancing ▶

- 🗐 Partsel Tool
- ✓ Selections
- 👆 View Report
- ✎ Excel
- 🅰 PDF

Select By: ▶

Plant: ▶

934

Analyzer: ▶

| ◀ |
|---|
| 24H |
| 26H |
| 27H |
| 30H |
| 31H ▶ |

PartPlant: ▶

Sort Report By

Report View | Item Inventory Balancing Detail ▶

FIG. 3

Item Inventory Balancing Summary

Dataset: 2004/06/05 09:36: 01 = Base [410] - 200405P2P
Rpt. Date: 2004-06-07 22:46:49
Page 1

Report sorted by Ext. Allocation Cost (desc), Ext. Remaining Excess Cost (desc), Item, Location

| Supplier's Location | Item | Description | Sync Date | Balancing Horizon | Excess Qty Available | Excess Qty Balanced | Extended Cost of Allocations | Extended Cost of Remaining Excess |
|---|---|---|---|---|---|---|---|---|
| 99B | 01X93 | HARD DRIVE | 20040524 | 20040816 | 20 | 15 | 48096.300 | 16032.100 |
| 99B | 01X02 | MEM UNIT | 20040524 | 20040816 | 32 | 32 | 43232.640 | 0.000 |
| 99B | 01Y34 | DISK DRIVE | 20040524 | 20040816 | 9193 | 2824 | 41315.120 | 5398.470 |
| 99B | 01Y35 | HARD DRIVE | 20040524 | 20040816 | 44 | 44 | 39856.960 | 0.000 |
| 93B | 39226 | HARD DRIVE | 20040524 | 20040816 | 16 | 3 | 22947.120 | 99437.520 |
| 99B | 4X137 | HARD DRIVE | 20040525 | 20040819 | 79 | 31 | 15699.020 | 24308.160 |

FIG. 4

Item Inventory Balancing Detail

Dataset: 2004/06/05 09:36: 01 = Base [410] - 200405P2P    Rpt. Date: 2004-06-08 13:12:10    Page 1

Report sorted by Item, Location

| Sup Loc | Sup ZA | Item | Description | Orderer's Location | Orderer's Anazlyzer | Orderer's Stock Date | Orderer's Stock Qty |
|---|---|---|---|---|---|---|---|
| 918 | FJF | 000X13 | HARD DRIVE | 992 | FEO | 20040625 | 48 |
| 918 | FJF | 000X10 | HARD DRIVE | 99B | FRY | 20040716 | 14 |
| 918 | FKV | 000Y13 | HARD DRIVE | 980 | 718 | 20040602 | 164 |
| 918 | FJF | 000X37 | HARD DRIVE | 99B | FRY | 20040531 | 6 |
| 918 | FJF | 000X94 | HARD DRIVE | 992 | FEO | 20040531 | 12 |
| 918 | FJF | 000Y17 | HARD DRIVE | 992 | FEO | 20040531 | 18 |

Item Detail Planning Sheet                                          Page 1

Dataset: 2004/06/05 09:36: 01 = Base [410] - 200405P2P    Rpt. Date: 2004-06-07 23:01:17
Plant 980                 Part:                Unit Cost:142.0000    Error Code: 0            Category: P
Description: Hard Drive   Analyzer: 729        Policy: E             VC: Y                    Yield: 0.00%
Sync Date: 20040525       Source: A            Supplier: Z90         Lead Time: 1             ReplenType: H
Safety Stock: 0           Dicing: -99          Packing: 1            Calendar:                ProtSchedDays: 0
Del Days: 5               DelSize: -99         DelSizeMin: 1         DelSizeMax: 10000000

| Category | Past Due | 04/05/31 | 04/06/07 | 04/06/14 | 04/06/21 | 04/06/28 | 04/07/05 | 04/07/12 | 04/07/19 | 04/07/26 |
|---|---|---|---|---|---|---|---|---|---|---|
| Ind. Demand | 0 | 0 | 0 | 0 | 0 | 0 | 0 | 0 | 0 | 0 |
| Dep. Demand | 0 | 0 | 0 | 0 | 0 | 0 | 0 | 0 | 0 | 0 |
| IP. Demand | 0 | 0 | 0 | 0 | 0 | 0 | 0 | 0 | 0 | 0 |
| Other Demand | 0 | 0 | 0 | 0 | 0 | 0 | 0 | 0 | 0 | 0 |
| Neg. Demand | 0 | 0 | 0 | 0 | 0 | 0 | 0 | 0 | 0 | 0 |
| Sub. Demand | 1114 | | | | | | | | | |
| Total. Demand | 1114 | | | | | | | | | |
| Stock | 1393 | | | | | | | | | |
| Return | 0 | 0 | 0 | 0 | 0 | 0 | 0 | 0 | 0 | 0 |
| In-Transit | 0 | 0 | 0 | 0 | 0 | 0 | 0 | 0 | 0 | 0 |
| Open Orders | 0 | 0 | 0 | 0 | 0 | 0 | 20 | 0 | 0 | 0 |
| Sub. Supply | 0 | 0 | 0 | 0 | 0 | 0 | 0 | 0 | 0 | 0 |
| Planned Orders | 0 | | | | | | | | | |
| Proj. on Hand | 279 | 279 | 279 | 279 | 279 | 279 | 299 | 299 | 299 | 299 |

| Category | 04/08/02 | 04/08/09 | 04/08/16 | 04/08/23 | 04/08/30 | 04/09/06 | 04/09/13 | 04/09/20 | 04/09/27 | 04/10/04 |
|---|---|---|---|---|---|---|---|---|---|---|
| Ind. Demand | 0 | 0 | 0 | 0 | 0 | 0 | 0 | 0 | 0 | 0 |
| Dep. Demand | 0 | 0 | 0 | 0 | 0 | 0 | 0 | 0 | 0 | 0 |
| IP. Demand | 0 | 0 | 0 | 0 | 0 | 0 | 0 | 0 | 0 | 0 |
| Other Demand | 0 | 0 | 0 | 0 | 0 | 0 | 0 | 0 | 0 | 0 |
| Neg. Demand | 0 | 0 | 0 | 0 | 0 | 0 | 0 | 0 | 0 | 0 |
| Sub. Demand | 0 | | | | | | | | | |
| Total. Demand | 0 | | | | | | | | | |
| Stock | | | | | | | | | | |
| Return | 0 | 0 | 0 | 0 | 0 | 0 | 0 | 0 | 0 | 0 |
| In-Transit | 0 | 0 | 0 | 0 | 0 | 0 | 0 | 0 | 0 | 0 |
| Open Orders | 0 | 0 | 0 | 0 | 0 | 0 | 0 | 0 | 0 | 0 |
| Sub. Supply | 0 | 0 | 0 | 0 | 0 | 0 | 0 | 0 | 0 | 0 |
| Planned Orders | 0 | | | | | | | | | |
| Proj. on Hand | 299 | 299 | 299 | 299 | 299 | 299 | 299 | 299 | 299 | 299 |

FIG. 7

| | Iolcplt | litmtot | Dpodstk | Dpodsat | Dpicdok | Qpictos | Frpmplant |
|---|---|---|---|---|---|---|---|
| 1 | 980 | 00000X10 | 20040602 | 20040601 | 20040528 | 164 | 918 |
| 2 | 992 | 000000X13 | 20040625 | 20040624 | 20040624 | 48 | 918 |
| 3 | 992 | 00000X47 | 20040531 | 20040528 | 20040528 | 12 | 918 |
| 4 | 992 | 00000Y31 | 20040531 | 20040528 | 20040528 | 18 | 918 |
| 5 | 99B | 000000Y36 | 20040716 | 20040715 | 20040708 | 14 | 918 |
| 6 | 99B | 000009X38 | 20040531 | 20040528 | 20040521 | 6 | 918 |

METHOD, SYSTEM, AND COMPUTER PROGRAM PRODUCT FOR PERFORMING INVENTORY MANAGEMENT

BACKGROUND OF THE INVENTION

The present invention relates generally to inventory management and, more particularly, to a method, system, and computer program product for performing balancing and redistribution of excess inventory.

Inventory management processes can be very complex, particularly with for large enterprises that have multiple sites situated in geographically diverse locations (e.g., world wide). Generally, when performing planning or forecasting operations, these sites look directly to existing suppliers (typically local suppliers) for their inventory replenishment needs. While in some cases this may be the most suitable course of action, at other times there may be readily available excess inventory at another site location. The ordering sites may, of course, inquire around at other site locations for a needed inventory item prior to sending its forecasts to suppliers. However, in today's on demand market, when inventory items require near instantaneous replenishment, this would not be a practical solution. Additionally, for enterprise models that handle, e.g., dozens of world-wide manufacturing locations (including forecasts comprising millions of rows of data), and calculate weekly forecasts over a long-term horizon, at least some degree of automation of the planning process is needed.

What is needed, therefore, is a way to improve inventory management processes that enable the efficient balancing and redistribution of excess inventory at an early stage in the forecasting process.

SUMMARY OF THE INVENTION

The foregoing discussed drawbacks and deficiencies of the prior art are overcome or alleviated by a method, system, and storage medium for performing inventory management. The method includes determining excess inventory for a plurality of site locations, determining inventory shortfalls for a plurality of site locations, and applying business logic to the excess inventory resulting in an inventory balancing plan. The inventory balancing plan includes optimal redistribution of excess inventory to site locations determined to be in need of the excess inventory. The method also includes generating and transmitting orders for the excess inventory in accordance with the inventory balancing plan prior to developing a supplier forecast.

A system for implementing inventory management includes a host system in communication with a plurality of site locations and an inventory balancing application executing on the host system. The inventory balancing application performs a method that includes determining excess inventory for the plurality of site locations, determining inventory shortfalls for the plurality of site locations, and applying business logic to the excess inventory resulting in an inventory balancing plan. The inventory balancing plan includes optimal redistribution of excess inventory to site locations determined to be in need of the excess inventory. The method also includes generating and transmitting orders for the excess inventory in accordance with the inventory balancing plan prior to developing a supplier forecast.

A computer program product for implementing inventory management includes instructions for performing a method. The method includes determining excess inventory for the plurality of site locations, determining inventory shortfalls for the plurality of site locations, and applying business logic to the excess inventory resulting in an inventory balancing plan. The inventory balancing plan includes optimal redistribution of excess inventory to site locations determined to be in need of the excess inventory. The method also includes generating and transmitting orders for the excess inventory in accordance with the inventory balancing plan prior to developing a supplier forecast.

BRIEF DESCRIPTION OF THE DRAWINGS

Referring to the exemplary drawings wherein like elements are numbered alike in the several FIGURES:

FIG. 3 is a user interface screen for searching and viewing item inventory balancing information in exemplary embodiments;

FIG. 4 is a is a sample report resulting from a search implemented via the user interface screen of FIG. 3 in exemplary embodiments;

FIG. 5 is a is a sample report resulting from a search implemented via the user interface screen of FIG. 3 in exemplary embodiments;

FIG. 6 is a user interface screen for searching and viewing item planning information in exemplary embodiments;

FIG. 7 is a sample report resulting from a search implemented via the user interface screen of FIG. 6 in exemplary embodiments; and FIG. 8 is a sample database table used in generating inventory balancing orders in exemplary embodiments.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF THE INVENTION

Disclosed herein is a method, system, and storage medium for performing inventory management. The inventory balancing processes of the invention enable more efficient use of a business' resources by moving inventory between sites when financially and/or logistically feasible. The inventory balancing processes enable automatic identification of excess inventory at inventory holding sites and reduce the inventory requirements for supplier forecasts at the inventory ordering sites. The inventory balancing processes further place orders on the inventory holding site for the excess inventory.

Figure 1:
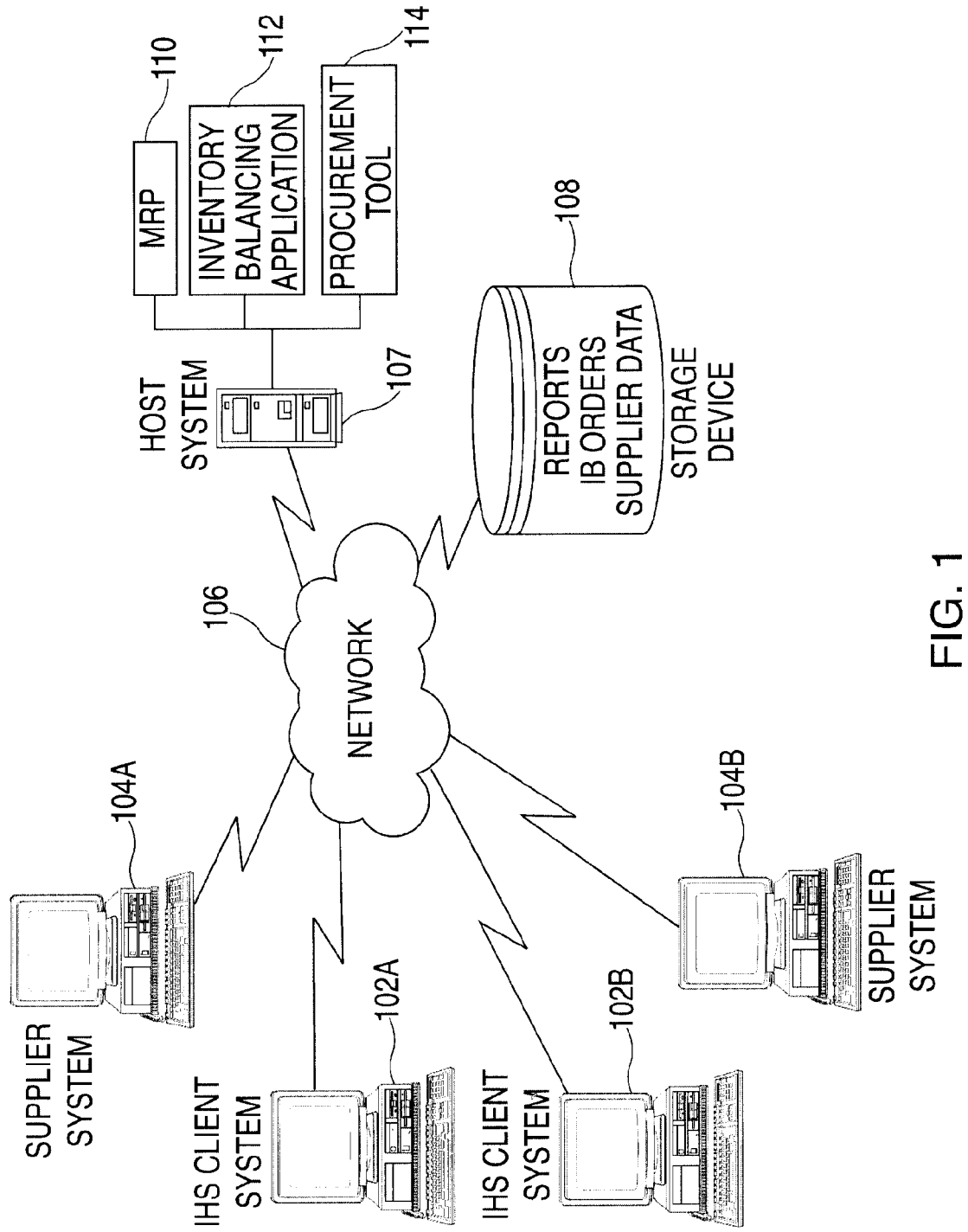
FIG. 1 is a block diagram of a system upon which the inventory balancing processes may be implemented in exemplary embodiments.

Turning now to FIG. 1, a system upon which the inventory balancing processes may be implemented in exemplary embodiments will now be described. For purposes of illustration, the inventory balancing processes described herein relate to a manufacturing environment; however, it will be understood that the inventory balancing processes may be used for other applications that involve supply or inventory management. The system of FIG. 1 includes inventory holding site (IHS) client systems 102A-102B, a host system 107, and storage device 108 in communication with one another via a network 106. Also included are supplier systems 104A-

104B that may communicate with host system 107 and/or IHS client systems 102A-102B via a network such as network 106.

Host system 107 may comprise one or more servers executing within, e.g., a server/client architecture. Host system 107 may be implemented by a central office of an enterprise for each of IHS client systems 102A-102B. Alternatively, a third-party service provider (e.g., application service provider) may implement the host system 107. In an exemplary embodiment, host system 107 is associated with a central office for IHS client systems 102A-102B and executes one or more applications for performing inventory balancing processes as described herein. The application(s) is referred to herein as inventory balancing application 112. Additionally, host system 107 may execute other applications typically found in a business enterprise environment. For example, host system 107 is executing a materials resource planning (MRP) application 110 and a procurement application 114. The inventory balancing application 112 may include an application programming interface (API) for integrating some of the functions performed by the MRP 110 and procurement application 114, such that information is passed between applications as needed. The inventory balancing application 112 may further include logic (or analysis engine) for processing the inventory data as described herein.

IHS client systems 102A-102B refer to computer/communication devices located at various enterprise site locations. For example, IHS client system 102A may be associated with a site location in Boston, while IHS client system 102B may be associated with a site location in San Francisco. While only two IHS client systems 102A-102B are shown in FIG. 1, it will be understood that any number of IHS client systems may be serviced by the inventory balancing application 112, and that additionally, site locations may be selectively serviced by the inventory balancing application 112. Each of IHS client systems 102A-102B may be implemented using a general-purpose computer executing a computer program for carrying out the processes described herein. Further, each of IHS client systems 102A-102B may comprise a personal computer (e.g., a lap top, a personal digital assistant). IHS client systems 102A-102B may store one or more databases of inventory information, supplier forecasts, and other suitable types of information. In alternative embodiments, one or more of IHS client systems 102A-102B may implement all or a portion of the inventory balancing processes described herein.

Network 106 may be any suitable type of communications network (e.g., a local area network, wide area network, internetwork, etc.). Further, network 106 may employ wireless communication technologies.

Storage device 108 may be implemented using a variety of devices for storing electronic information. It is understood that the storage device 108 may be implemented using memory contained in the host system 107 or it may be a separate physical device as shown in FIG. 1. Storage device 108 may be logically addressable as a consolidated data source across a distributed environment that includes network 106. Information stored in storage device 108 may be retrieved and manipulated via the host system 107, IHS client systems 102A-102B, or a combination of both. In alternative embodiments, authorized supplier systems 104A-104B may also retrieve information stored in storage device 108. Storage device 108 stores reports, inventory balancing orders, supplier information, etc., as will be described further herein.

Supplier client devices 104A-104B refer to computer/communication devices operated by supplier entities that provide inventory replenishment to one or more of IHS client systems 102A-102B. While only two supplier client systems 104A-104B are shown in FIG. 1, it will be understood that any number of supplier client systems may be associated with IHS client systems 102A-102B. Each of supplier client systems 104A-104B may be implemented using a general-purpose computer executing a computer program for communicating with corresponding client systems. Further, each of supplier client systems 104A-104B may comprise a personal computer (e.g., a lap top, a personal digital assistant).

The inventory balancing system improves inventory management processes and enables efficient balancing and redistribution of excess inventory at an early stage in an enterprise's forecasting process. The inventory balancing activities are implemented during, e.g., explosion of an enterprise's bills of material (BOM) and prior to generating a supplier forecast.

Figure 2:
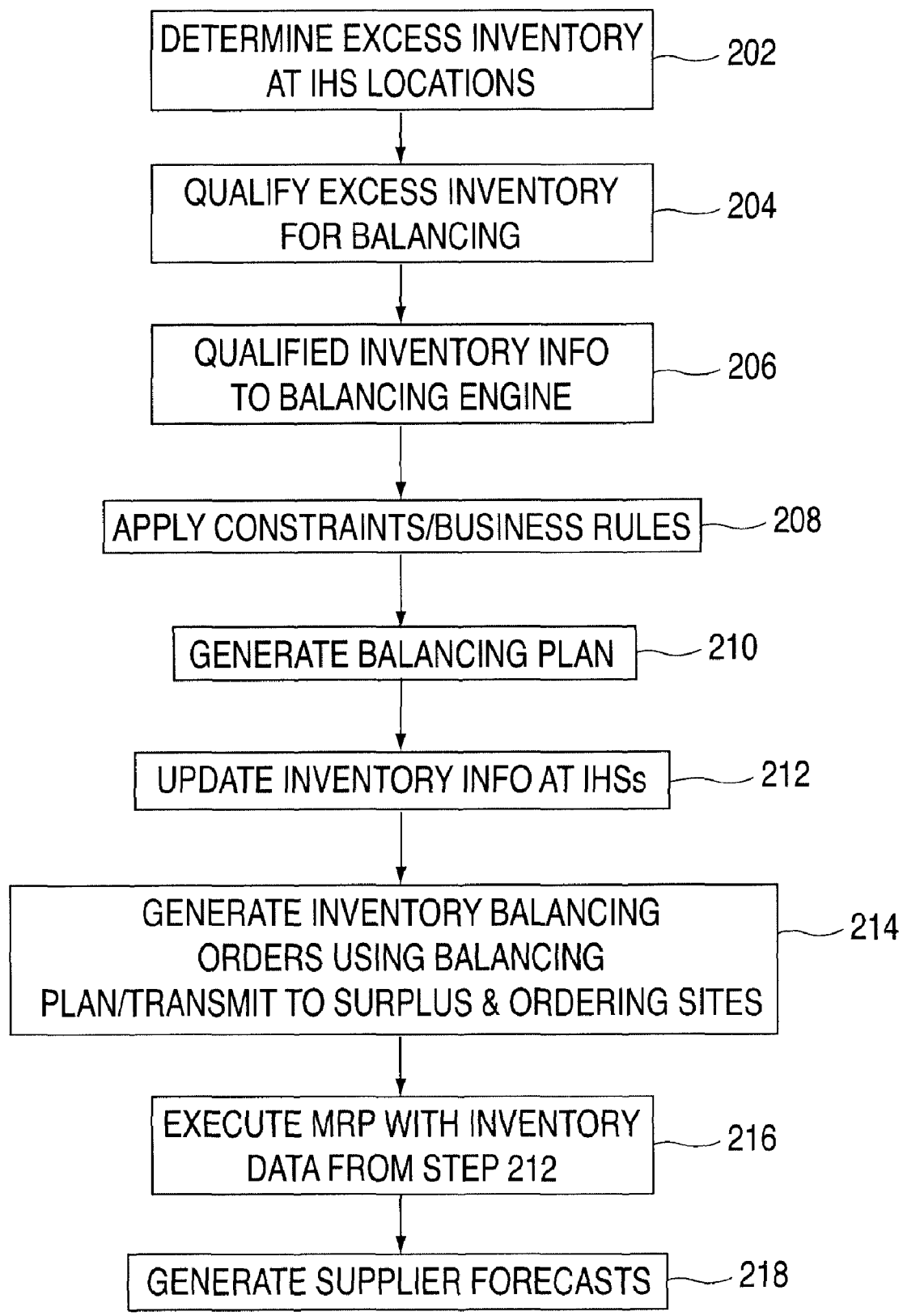
FIG. 2 is a flow diagram describing a process for implementing inventory balancing functions in exemplary embodiments.

Turning now to FIG. 2, a process of implementing the inventory balancing processes in accordance with exemplary embodiments will now be described. For each IHS, any excess inventory is determined at step 202. The inventory balancing application 112 calculates excess inventory where supply exceeds forecasted demand over a variable time horizon. The time horizon may be specified by a user. The excess inventory is qualified in order to determine whether it is acceptable for balancing at step 204. Qualification may be performed in accordance with the needs of the enterprise. As an example, one qualification process determines whether the excess value meets or exceeds a location's specified clip levels. The clip levels provide information concerning the cost-benefits of implementing a balancing process. For example, the clip levels may specify a requirement that the expected benefits derived from balancing the excess must be significant enough to offset the shipping costs (including tariffs and duties), along with order administration costs. The qualification may also be determined, at least in part, by the excess holding site. For example, due to the uncertainties in forecasting, the holding site may decide to hold onto a percentage of the excess inventory and allow the remaining excess inventory to be balanced.

Qualified excess inventory is then provided to the analysis engine (also referred to as balancing engine) of the inventory balancing application 112 at step 206. The balancing engine processes the qualified excess inventory in accordance with adopted business rules at step 208. These business rules may be user-defined by specific site locations (e.g., IHS client systems 102A-102B) and/or by host system 107.

One consideration used for determining priority in balancing may be the location of the excess and the location of the need. For example, the inventory balancing application 112 may be configured such that due to the unusually high costs of shipping heavy machinery, the priority for allocation of excess inventory (the heavy machinery) should be restricted to IHSs located within a limited geographic area. Thus, as between two enterprise sites situated in two different locations, both of which have a need for a particular item, the excess inventory for the particular item would be allocated to the site which is closest to the excess inventory holding site. Another consideration that may be used in determining priority in balancing may be the criticality of the shortage (or the severity of the need). Further considerations that may be taken into account in determining priority may include the amount of the need (e.g., the quantity of the inventory items needed). It will be understood that other considerations may be utilized in determining priority as well.

A balancing plan is generated as a result of the analysis performed via the balancing engine at step 210. The balancing plan determines optimal redistribution of excess inventory items in accordance with the business rules adopted.

Once the candidates with excess inventory for balancing have been determined and the balancing plan adopted, the inventory balancing application 112 identifies where there is a need for this excess. A need may be defined as any uncovered demand within a time horizon. This time horizon can be set for each individual enterprise site location and may be approved by the process owner. This horizon indicates within how many weeks the excess can be consumed (i.e., so that inventory is not shipped for a need that is a long way out in time).

At step 212, the inventory information (databases) for each enterprise site location (e.g., IHS client systems 102A-102B) is updated to reflect redistribution of qualified excess inventory.

At step 214, inventory balancing orders are generated by the procurement application 114 using the balancing plan derived from step 210 via, e.g., an API of the inventory balancing application 112, and are transmitted to both the shortage and excess inventory site locations. The inventory balancing orders may be stored in both the excess site locations and the demand site locations. Upon shipment of the excess inventory, the inventory information may then be decremented from the excess inventory holding site's databases and, upon receipt of the excess inventory by the demand IHS location, the inventory information may be incremented within the demand, or receiving, inventory holding site's databases.

The host system 107 executes MRP 110 using the inventory data resulting from steps 212 and 214 via, e.g., an API of the inventory balancing application 112 at step 216 and sends the results to each of the applicable IHS client systems 102A-102B.

At step 218, the IHS client systems 102A-102B generate supplier forecasts that account for the decremented demand resulting from the balancing processes described above (if applicable), which are then sent to one or more of supplier systems 104A-104B.

As described above, various reports (and user interface screens for generating the reports) are available through the inventory balancing application 112, a sampling of which is shown in FIGS. 3-8.

Turning now to FIG. 3, a sample user interface screen for enabling a user of the inventory balancing application 112 to search and view item inventory balancing information in exemplary embodiments is depicted. The user interface screen of FIG. 3 enables a user to search for inventory balancing information by, e.g., site location (also referred to as Plant) or by Analyzer. The Analyzer refers to the process owner for an enterprise site location that has qualified excess inventory or needs inventory.

FIG. 4 is a sample report resulting from a search implemented via the user interface screen of FIG. 3. The report shown in FIG. 4 provides a listing of site locations with excess inventory and is sorted by IHS location. The type of information that may be provided includes an identification and description of the inventory items in excess, as well as the balancing horizon date, excess quantity available, excess quantity balanced and costs of allocation.

Turning now to FIG. 5 a sample report resulting from a different search implemented via the user interface screen of FIG. 3 is shown. The report shown in FIG. 5 provides the identification of the excess inventory holding site and corresponding ordering sites (demand site locations).

Figure 6:
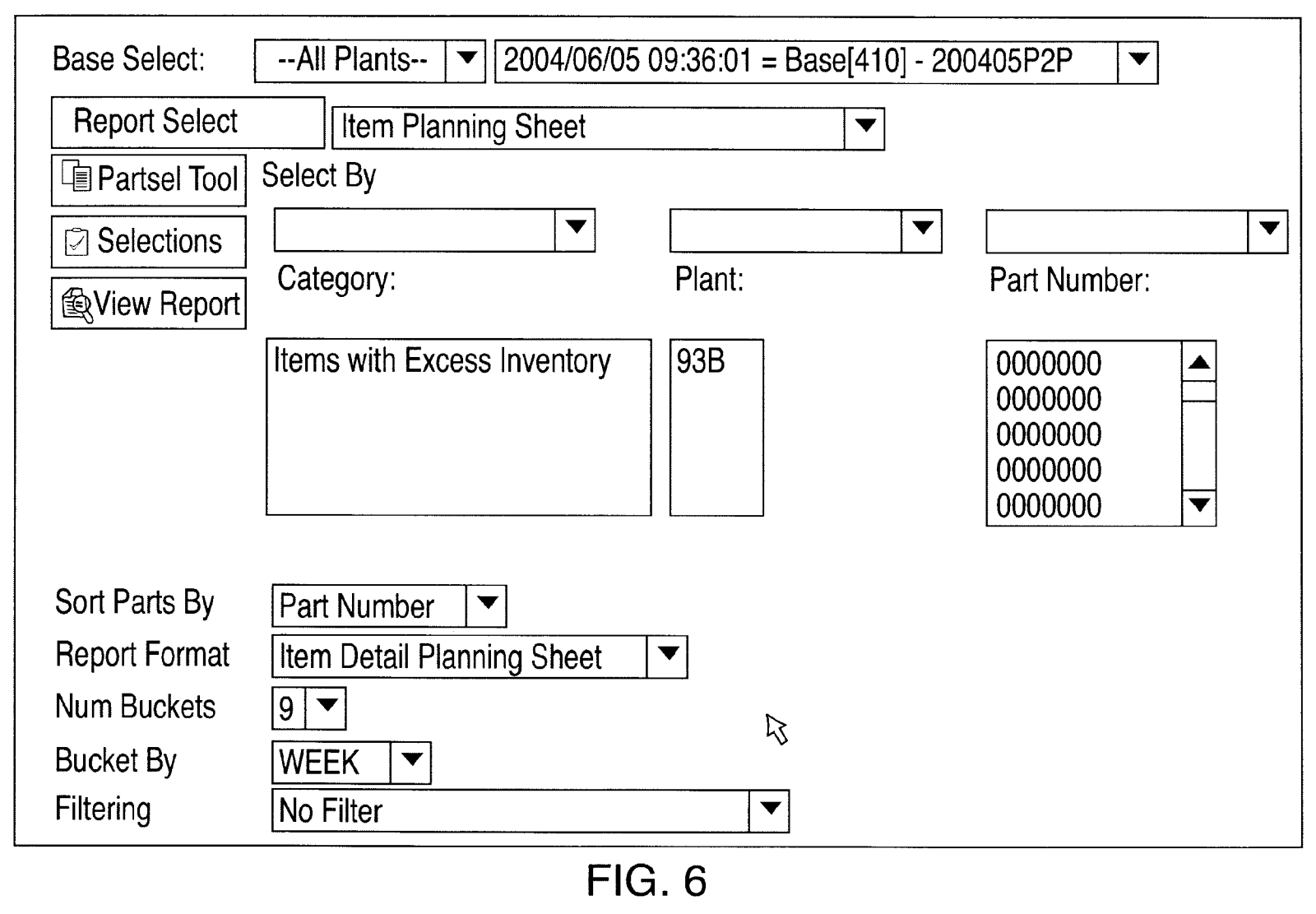

FIG. 6 is a sample user interface screen for searching and viewing item planning information in exemplary embodiments. A user may search for items with excess inventory for a given location (Plant), as well as by the part numbers for the items. FIG. 7 is a sample report resulting from a search implemented via the user interface screen of FIG. 6.

As shown in FIG. 8, a sample database table that may be used in generating inventory balancing orders in exemplary embodiments is provided.

As described above, the inventory balancing processes of the invention enable more efficient use of a business' resources by moving inventory between sites when financially and/or logistically feasible. The inventory balancing processes enable automatic identification of excess inventory at inventory holding sites and reduce the inventory requirements for supplier forecasts at the inventory ordering sites. The inventory balancing processes further place orders on the inventory holding site for the excess inventory.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for performing inventory management, comprising:

determining, by a computer, excess inventory for a plurality of site locations;

determining, by the computer, inventory shortfalls for a plurality of site locations;

applying, by the computer, business logic to the excess inventory resulting in an inventory balancing plan, the inventory balancing plan including optimal redistribution of excess inventory to site locations determined to be in need of the excess inventory, the optimal redistribution including setting a priority for redistributable inventory;

generating and transmitting, by the computer, orders for the excess inventory in accordance with the inventory balancing plan prior to developing a supplier forecast; and generating a supplier forecast decremented in response to the applying, the decrementing comprising reducing the supplier forecast according to the orders for excess inventory.

2. A system for performing inventory management, comprising:
a host system in communication with a plurality of site locations; and
an inventory balancing application executing on the host system, the inventory balancing application configured to perform:
determining excess inventory for the plurality of site locations;
determining inventory shortfalls for the plurality of site locations;
applying business logic to the excess inventory resulting in an inventory balancing plan, the inventory balancing plan including optimal redistribution of excess inventory to site locations determined to be in need of the excess inventory, the optimal redistribution including setting a priority for redistributable inventory;
generating and transmitting orders for the excess inventory in accordance with the inventory balancing plan prior to developing a supplier forecast; and
generating a supplier forecast decremented in response to the applying, the decrementing comprising reducing the supplier forecast according to the orders for excess inventory.

3. A computer program product comprising:
a non-transitory storage medium having instructions embodied thereon, which when executed implement inventory management, the instructions implementing a method, the method comprising:
determining excess inventory for a plurality of site locations;
determining inventory shortfalls for a plurality of site locations;
applying business logic to the excess inventory resulting in an inventory balancing plan, the inventory balancing plan including optimal redistribution of excess inventory to site locations determined to be in need of the excess inventory, the decrementing comprising reducing the supplier forecast according to the orders for excess inventory;
generating and transmitting orders for the excess inventory in accordance with the inventory balancing plan prior to developing a supplier forecast; and
generating a supplier forecast decremented in response to the applying, the decrementing comprising reducing the supplier forecast according to the orders for excess inventory.

4. The method of claim 1, wherein the excess inventory and the inventory shortfalls are determined by inventory item identification.

5. The method of claim 1, wherein the excess inventory and the inventory shortfalls are determined by quantity of excess inventory and quantity of need.

6. The method of claim 1, further comprising qualifying the excess inventory prior to applying business logic, the qualifying including:
evaluating costs associated with re-allocating the excess inventory to a location in light of benefits of the re-allocating; and
approving the excess inventory for redistribution if the benefits equal or outweigh the costs; and
excluding the excess inventory from redistribution if the benefits are outweighed by the costs;
wherein the business logic is applied to results of the qualifying.

7. The method of claim 1, further comprising qualifying the excess inventory prior to applying business logic, the qualifying including:
disqualifying a portion of the excess inventory from redistribution based upon a user-determined need to withhold the portion of the excess inventory;
wherein the business logic is applied to results of the qualifying.

8. The method of claim 1, wherein the priority is determined based upon at least one of:
geographic distance between a location holding the excess inventory and a location in need of the excess inventory; and
criticality of a need for the excess inventory.

9. The method of claim 1, further comprising updating local inventory databases of the plurality of site locations affected by the redistribution of excess inventory to reflect the redistribution of excess inventory.

10. The system of claim 2, wherein the excess inventory and the inventory shortfalls are determined by inventory item identification.

11. The system of claim 2, wherein the system further comprises qualifying the excess inventory prior to applying business logic, the qualifying including:
evaluating uncertainties in a demand forecast;
approving the excess inventory for redistribution if the uncertainties in the demand forecast are below a threshold; and
excluding the excess inventory from redistribution if the uncertainties are above a threshold uncertainties are above a threshold.

12. The system of claim 2, wherein the inventory balancing application further performs qualifying the excess inventory prior to applying business logic, the qualifying including:
evaluating costs associated with re-allocating the excess inventory to a location in light of benefits of the re-allocating; and
approving the excess inventory for redistribution if the benefits equal or outweigh the costs; and
excluding the excess inventory from redistribution if the benefits are outweighed by the costs;
wherein the business logic is applied to results of the qualifying.

13. The system of claim 2, wherein the inventory balancing application further performs qualifying the excess inventory prior to applying business logic, the qualifying including:
disqualifying a portion of the excess inventory from redistribution based upon a user-determined need to withhold the portion of the excess inventory;
wherein the business logic is applied to results of the qualifying.

14. The system of claim 2, wherein the priority is determined based upon at least one of:
geographic distance between a location holding the excess inventory and a location in need of the excess inventory; and
criticality of a need for the excess inventory.

15. The computer program product of claim 3, wherein the excess inventory and the inventory shortfalls are determined by inventory item identification.

16. The computer program product of claim 3, wherein the excess inventory and the inventory shortfalls are determined by quantity of excess inventory and quantity of need.

17. The computer program product of claim 3, further comprising instructions for qualifying the excess inventory prior to applying business logic, the qualifying including:

evaluating costs associated with re-allocating the excess inventory to a location in light of benefits of the re-allocating; and approving the excess inventory for redistribution if the benefits equal or outweigh the costs; and disallowing the excess inventory for redistribution if the benefits are outweighed by the costs;

wherein the business logic is applied to results of the qualifying.

18. The computer program product of claim 3, further comprising instructions for qualifying the excess inventory prior to applying business logic, the qualifying including:

disqualifying a portion of the excess inventory from redistribution based upon a user-determined need to withhold the portion of the excess inventory;

wherein the business logic is applied to results of the qualifying.

19. The computer program product of claim 3, wherein the priority is determined based upon at least one of:

geographic distance between a location holding the excess inventory and a location in need of the excess inventory; and criticality of a need for the excess inventory.

20. The computer program product of claim 3, further comprising instructions for updating local inventory databases of the plurality of site locations affected by the redistribution of excess inventory to reflect the redistribution of excess inventory.

* * * * *